United States Patent [19]

Shah

[11] Patent Number: 4,610,551

[45] Date of Patent: * Sep. 9, 1986

[54] ULTRASONIC TEMPERATURE SENSOR

[75] Inventor: Kirti C. Shah, North Billerica, Mass.

[73] Assignee: General Electric Co., Schenectady, N.Y.

[*] Notice: The portion of the term of this patent subsequent to Sep. 17, 2002 has been disclaimed.

[21] Appl. No.: 749,963

[22] Filed: Jul. 1, 1985

Related U.S. Application Data

[62] Division of Ser. No. 574,790, Jan. 27, 1984, Pat. No. 4,541,732.

[51] Int. Cl.⁴ ............................................. G01K 11/22
[52] U.S. Cl. ..................................... 374/117; 374/119
[58] Field of Search ................ 374/117, 119; 310/334

[56] References Cited

U.S. PATENT DOCUMENTS

| | | | |
|---|---|---|---|
| 3,214,977 | 11/1965 | Apfel | 374/117 |
| 3,487,690 | 1/1970 | Bell et al. | 374/117 |
| 3,540,265 | 11/1970 | Lynnworth | 374/119 |
| 3,584,327 | 6/1971 | Murry | 310/334 |
| 3,595,082 | 7/1971 | Miller, Jr. | 374/119 |
| 3,717,033 | 2/1973 | Gordon et al. | 374/119 |
| 3,738,171 | 6/1973 | Shepard et al. | 374/119 |
| 4,541,732 | 9/1985 | Shah | 374/117 |

Primary Examiner—Charles Frankfort
Assistant Examiner—Thomas B. Will

[57] ABSTRACT

An ultrasonic temperature sensor is based upon the variation in the speed of propagation of a torsional wave in a material whose torsional modulus varies as a function of temperature. A transducer for producing a torsional wave is coupled through an acoustic waveguide to a sensor element which has a torsional modulus which varies with temperature. A discontinuity in the sensor causes a portion of the torsional wave to be reflected while the remainder traverses the sensor and is reflected. The time delay between the first and second pulses is thus a measure of the temperature.

8 Claims, 5 Drawing Figures

ULTRASONIC TEMPERATURE SENSOR

This application is a division of application Ser. No. 574,790 filed Jan. 27, 1984 now U.S. Pat. No. 4,541,732.

The instant invention relates to a temperature measuring device. More particularly, it relates to a temperature sensor using ultrasonic torsional waves to measure temperature.

Temperature measurements at high temperature environments such as may be found in jet engines for example are usually effected by means of thermocouple probes, resistive temperature devices having either positive or negative coefficients of resistance with temperature, or the like. These devices have been used for many years to measure temperature but they do suffer from a variety of shortcomings.

Applicant has discovered that accurate and highly sensitive temperature measurements may be achieved by means of ultrasonic temperature measurements in which ultrasonic wave is caused to traverse a path which has a temperature sensitive modulus. The speed of propagation and hence the traverse time of the wave over the path is a function of temperature so that temperature can be measured by means of a time difference approach. That is, by measuring the time difference between two pulse echos representing the transit time of a torsional wave over the sensor path, the temperature of the environment in which the sensor is positioned may be determined by measuring the time difference between two echos over a path whose propagational velocity is temperature sensitive. This approach readily lends itself to the direct production of a digital output. In addition, the waveguide-sensor arrangement can be constructed of a very thin, flexible material so that sensor can be easily inserted into areas with complex geometries and where only very small spaces are available.

It is therefore a principal objective of the instant invention to provide a temperature measuring device of the ultrasonic type.

A further objective is to provide a digital temperature sensor of the ultrasonic variety.

Yet another objective of the invention is to provide an ultrasonic temperature sensor in which the propagation of velocity of the ultrasonic wave is a function of temperature.

Still another objective of the invention is to provide an ultrasonic temperature sensor of the time difference type in which the time difference is a function of temperature.

Still other objectives and advantages of the invention will become apparent as the description thereof proceeds. The various advantages and objectives of the instant invention are realized in an ultrasonic temperature sensor in which a torsional ultrasonic wave is transmitted over a path which is temperature responsive so that the time required for the wave to traverse said path is a function of temperature.

Specifically, the path is constituted of a material which has a torsional modulus which varies with temperature. As a result, the velocity of the torsional wave along the path varies with temperature and the transport time is a measure of temperature. In the preferred mode, a transmission path for the torsional waves is provided which has a discontinuity or impedance change so that part of the torsional wave is reflected upon striking the discontinuity to produce a first reflected pulse. The remaining energy traverses and is reflected from the end of the sensor path to produce a second pulse which represents the traverse time over the path. The time differential between the two pulses thus represents propagation velocity of the torsional wave over the path; a propogation velocity which is a function of temperature.

As the torsional wave travels along the sensing path and is reflected from the end, its velocity through the elastic medium depends on the density and torsional modulus of the material. When the temperature of the medium in which sensing path is immersed changes, the modulus and, hence, the time delay of the reflected pulse changes in the following way:

$$\frac{\Delta D_T | \Delta T}{D_T} = \frac{\Delta L}{L} - \frac{\Delta G | \Delta T}{2G} \text{ and } D_T = L \sqrt{\frac{f}{G}}$$

Where:
 $\Delta$ = a finite change
 $D_T$ = Delay time
 $L$ = Length of sensor path
 $f$ = Density of sensor path material
 $G$ = Torsional Modulus (i.e., modulus of rigidity)
 $\Delta L | \Delta T / L$ (i.e., the relative change of length of the sensor path with temperature) is small for most materials. The relative time delay change is, therefore, dependent mainly on $\Delta G | \Delta T / 2G$.

The novel features which are believed to be characteristic of the invention are set forth with particularity in the appended claims. The invention itself, however, both as to its organization and method of operation, together with further objectives and advantages thereof, may best be understood by reference to the following description taken in connection with the accompanying drawings in which:

FIG. 1 is a schematic of the ultrasonic temperature sensor.

FIG. 2 graphically illustrates the time delays between the pulse echos produced by the traverse of the torsional wave through the sensor path.

Figure 1:
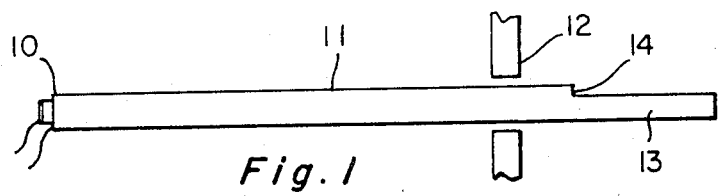

FIG. 1 is a schematic illustration of the ultrasonic, time-based temperature sensor of the instant invention and includes a piezoelectric transducer 10 mounted at one end of an acoustic waveguide 11. Transducer 10 which is secured to the waveguide by brazing or otherwise, transmits a torsional wave down the waveguide to a temperature sensing portion 13 located at the end of the waveguide. Transducer 10, as will be pointed out in detail later, is preferably a doughnut (torus) shaped piezoelectric ceramic which is circularly polarized so that it produces a torsional wave pulse whenever an input pulse energizes transducer 10. Temperature sensing portion 13 at the end of the waveguide extends through a housing or wall, shown generally at 12, into the area where temperature is to be measured. The temperature sensing portion includes a first discontinuity in the wave transmission path, in the form of a shoulder, notch, or channel 14. A portion of the torsional wave traveling down the waveguide is reflected when it strikes the discontinuity and the remainder traverses the temperature sensing portion 13 and is reflected from the discontinuity at the end. The speed of propagation of the torsional wave over sensing path 13 depends on the torsional modulus of the path which, in turn, is a function of temperature. Hence, the time delay between the two pulses is dependent on the temperature and can be calibrated to measure temperature.

Figure 2:
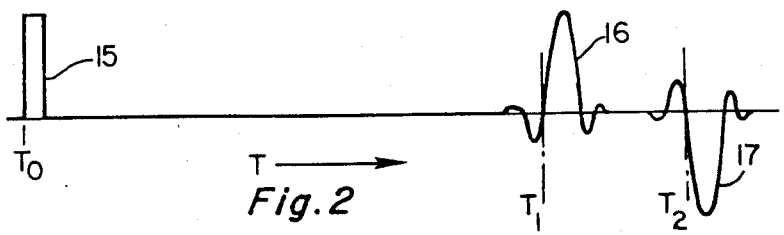

FIG. 2 illustrates the wave forms showing the driving pulse, the first echo pulse from the discontinuity represented by shoulder 14 and the reflected pulse from the end of the sensing path. In FIG. 2 time is plotted along the abcissa and shows a driving or input pulse 15 at time to which periodically drives piezoelectric transducer 10 to transmit a torsional wave down the waveguide to the temperature sensing portion. At time $t_1$ a portion of the torsional wave is reflected from the step or discontinuity 14 to produce a positive pulse 16. At time $t_2$ inverted pulse 17 which is the reflected pulse from the end of the sensor is received. The time delay, $t_2-t_1$, between the pulses represents a measure of the temperature to which the sensor path is exposed because the sensor density and the torsional modulus, which affects the velocity of the torsional waves vary with temperature. By measuring time delay, the temperature to which the sensor is exposed may be readily determined.

Figure 3:
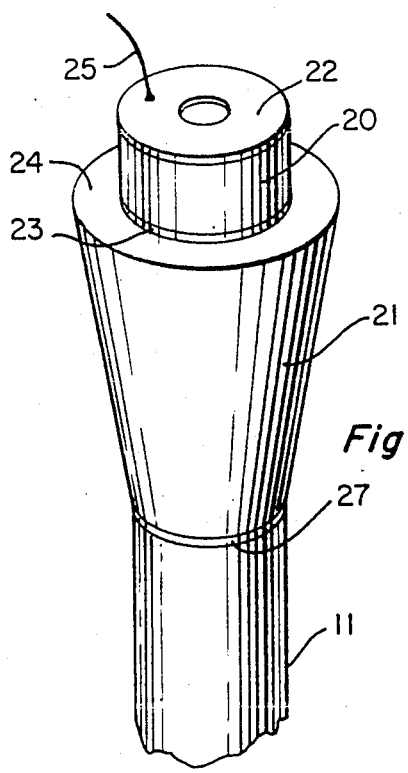
FIG. 3 is a detailed showing of the sensor including the piezoelectric transducer and taping coupler for the sensor.

FIG. 3 illustrates one physical embodiment of the sensor in which the driving transducer is coupled to the waveguide by a tapered, and preferably cone-shaped coupler. In order to maximize the torsional wave by means of large-size transducer crystals while simultaneously using very flexible, small diameter waveguide and sensor elements, large transducer mounting areas must be provided along with transition couplers to the smaller diameter waveguide. Thus, a driving crystal transducer in the form of a torous or doughtnut 20 is mounted on the base of a cone-shaped mounting head 21. Transducer 20 is a circularly polarized piezoelectric ceramic in the shape of a torus having a thin electrode 22 deposited on the upper surface and a solder bond connector electrode 23 connected between the lower surface of the transducer and the upper surface 24 of the cone-shaped mounting head. Wires 25 connect the electrodes to a pulse generating source, not shown. When the crystal is excited by a driving pulse applied to the electrodes, the transducer vibrates in a torsional mode. The torsional wave is transmitted to the waveguide 11 and the sensing element through cone-shaped mounting head 21 which is fastened to waveguide 11 by a weld or braze connection 27. Reflected pulses from the step or discontinuity representing the beginning of the sensing head and the echo pulse from the end of the sensor are also received by the transducer and transmitted to suitable circuitry, presently to be described which measures the time delay between the pulses.

Circularly polarized transducer crystals are commercially available and, in one form, may be obtained from the Channel Products Co., of Chesterland, Ohio under their designation CPI-1000

Although a circularly polarized doughnut shaped (torus) piezoelectric transducer is preferred for generating the torsional waves, the result may be realized with other configurations. For example, two rectangular crystals polarized in the shear mode can be mounted in parallel on the end of the coupler with the directions of polarization opposing each other. When voltages are applied to the crystals in a direction perpendicular to the direction of polarization, the shear stresses, because of their opposite polarization, are in opposite directions. This sets up a force couple which generates a torsional wave.

Mounting of the waveguide and temperature sensor of the invention requires some care in order to prevent attenuation or loss of signal. This is so because most of the signal of the torsional wave travels in the outer one-third of the waveguide so that indiscriminate clamping can have an adverse affect on signal. In order to minimize such an effect when clamping on the outside, it is highly desirable to clamp the waveguides at the nodal points of the waves thereby minimizing loss of signal. Careful mounting on the exterior of the waveguide thus presents a problem in finding nodal points or points of minimum signal attenuation.

Figure 4:
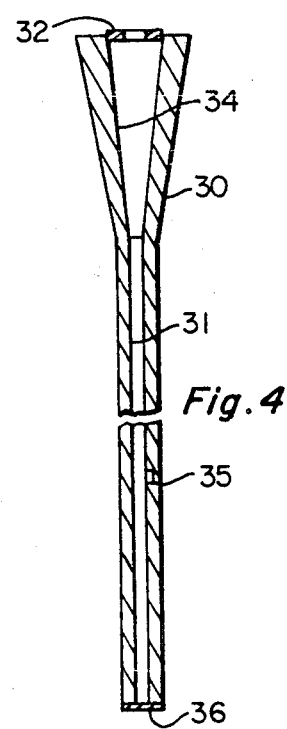
FIG. 4 illustrates an alternative embodiment using a hollow waveguide and sensor.

FIG. 4 shows an alternative construction in which the ultrasonic temperature sensor utilizes a hollow waveguide construction. The advantage of using a hollow waveguide is that it permits clamping the exterior of the waveguide without any signal attenuation. That is, by utilizing a hollow waveguide and transmitting the torsional wave along the inner diameter of the hollow waveguide, the waveguide may be clamped at any point on the outer diameter without interferring with the torsional wave or in any way attenuating it. FIG. 4 illustrates such a construction and consists of a hollowed cone 30 attached to a hollow waveguide 31. A crystal 32 is positioned at the top of a central passage 34 which passes through the cone and waveguide. When crystal 32 is excited by an input pulse, torsional waves travel down the inner wall of the passage 34. Positioned near the end of the waveguide is a discontinuity in the form of small semi-circular channel or notch 35. A portion of the torsional wave is reflected from channel 35. The remaining energy is transported to the end of a passage which is sealed by means of a disc 36 to produce the reflected pulse, with the time delay between the pulse reflected from the discontinuity 35 and from the end plate 36 representing the temperature to which the sensor is exposed. Preferably, the interior of the rod is hermetically sealed at both ends and the air is exhausted prior to final sealing. By evacuating the inner passage attenuation of the torsional signal transported is minimized.

Figure 5:
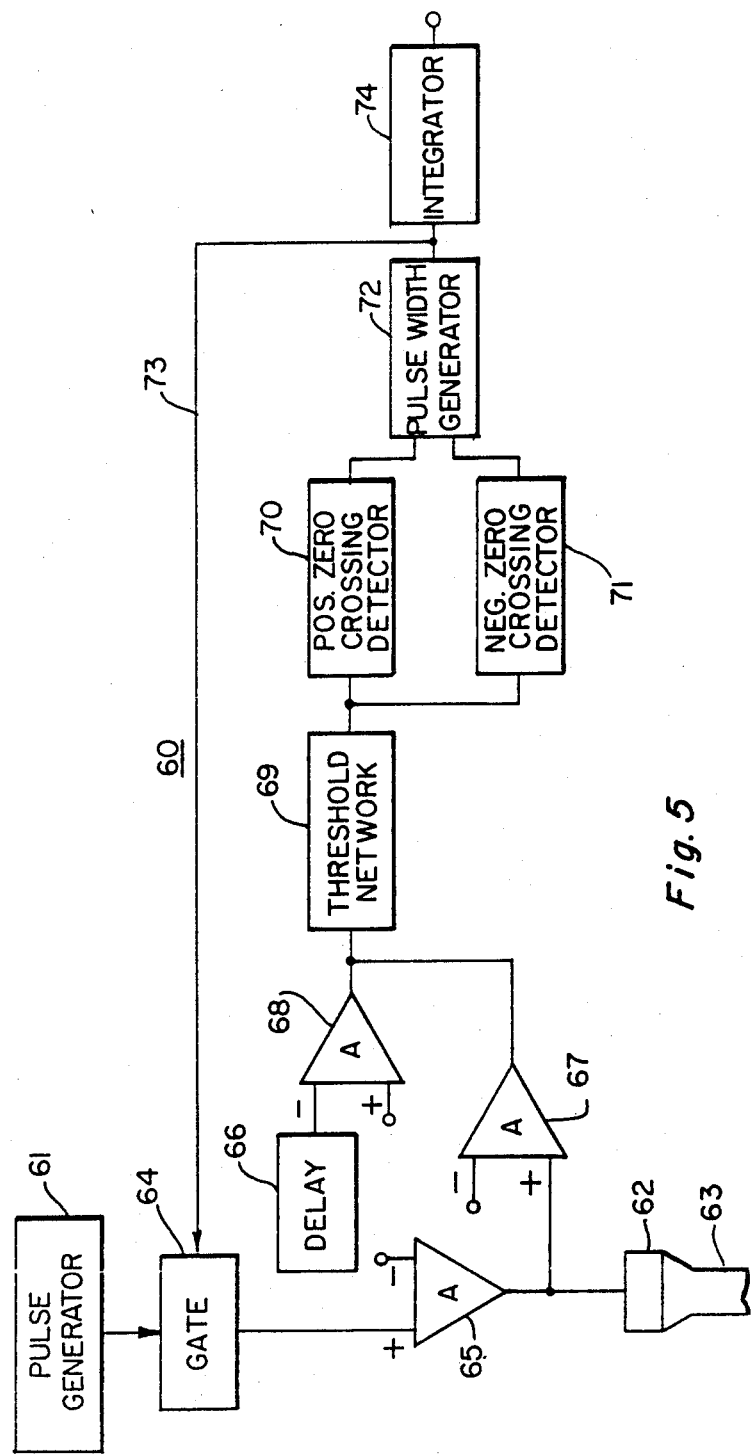
FIG. 5 illustrates a network for sensing the time delay between the reflected pulses.

FIG. 5 illustrates a signal processing network 60 for producing a signal proportional to the time delay between the two reflected pulses. Network 60 includes the pulse generator 61 for supplying excitation pulses to transducer 62 coupled to one end of the cone shaped mounting head 63 which, in turn, is coupled to the waveguide and sensing element. The excitation pulses from generator 61 pass through gate 64 and buffer amplifier 65 to transducer 62. Gate 64 is controlled from the output of the time interval measuring network to prevent further excitation of the transducer until the time delay between the reflected pulses is measured. The energizing pulse is also applied to a delay network 66 and to a further buffer amplifier 67. The delayed pulse from delay network 66 is applied to the inverting terminal of an operational amplifier 68 and the non-inverting input of amplifier 67. The output from buffer amplifier 67 is also applied to the output of operational amplifier 68.

The energizing pulse from buffer amplifier 67 is applied to a threshold network 69 and thence to a pair of zero crossing detectors 70 and 71 with detector 70 being a positive zero crossing detector and 71 a negative zero crossing detector. The outputs from the zero crossing detectors are supplied to a pulse width generator 72 which produces a pulse the width of which is proportional to the time delay between the reflected pulses from the temperature sensors. Delay network 66, operational amplifier 68 and buffer amplifier 65 and 67 are provided so as to prevent interference between the energizing pulse and the reflected pulses from the temperature sensor. Thus the initial energizing pulse from pulse generator 61 is applied to the threshold network 69 via buffer amplifier 65 and 67. The initial pulse is sensed by the positive zero crossing detector to actuate pulse width generator 72. A short time thereafter, the delayed, inverted pulse from amplifier 68 produces an output from negative zero crossing detector 71 to terminate the pulse from pulse width generator 72. Pulse width generator 72 is now inactivated and will be activated by the first return pulse from the discontinuity in the temperature sensing path to initiate measurement of the time delay. As was shown in FIG. 2, the first echo pulse has a positive going portion which is sensed by the positive zero crossing detector 70 to trigger pulse width generator 72 to generate a positive pulse. This positive pulse is also applied to gate 64, over line 73, to disable the gate and prevent further pulses from being transmitted to the transducer. Pulse width generator 72 continues to produce a positive output until the appearance of the negative pulse from the end of the sensor. The first negative going zero cross over produces an output from negative zero crossing detector 71 which terminates the pulse from generator 72. The width of the positive pulse from generator 72 is thus directly proportional to the time delay between these pulses which in turn is proportional to the temperature. As the pulse from generator 72 is terminated, the negative going edge of that pulse is applied to lead 73 enabling gate 64 to allow another pulse from pulse generator 61 to be transmitted to the transducer.

The output from pulse width generator 72 is applied to an integrating network 74 which produces an output signal which is proportional to the width of the pulse from generator 72 and hence to the temperature. The output from the integrating network is supplied to an indicating means calibrated in terms of temperature. The network illustrated in FIG. 5 for determining the time delay between the pulses and hence the temperature to which the sensor has been exposed is exemplary only and it will be understood by those skilled in the art that a variety of other processing networks may be utilized to achieve the same results. For example, the variable width pulse can be applied to counter which a pulse generator coupled to it. The variable width pulse enables the counter which counts the pulses with the number of pulses counted being directly proportional to pulse width and, hence, delay time and temperature.

The sensors illustrated in FIGS. 1 and 4 show arrangements in which the torsional energy is reflected from sharp discontinuities such as shoulder 14 and the sharp edge at the end of path 13. These sharp discontinuities can cause "ringing" effects and may pose difficulties in measuring the reflected pulses; difficulties in the sense that more elaborate signal processing circuitry is required than would be the case if a sharper, more defined signal is produced. This is particularly true with respect to the configuration at the end of the sensor. Applicant has found that by rounding the discontinuities, a sharper signal will be produced. The most effective way of achieving this result is with a sensor in which sensing path 13 is fabricated with a spherical end.

Furthermore, the first discontinuity 14 may be modified by providing a rounded notch rather than the shoulder 14.

It will be apparent from the foregoing description that an ultrasonic temperature measuring system has been described which uses the principal of time delay of pulse echo transmitted along a acoustic path in which the time delay is due to an increase in temperature which affects the velocity of propogation of an ultrasonic wave down that path.

While the instant invention has been known in connection with certain embodiments thereof, the invention is by no means limited thereto since other modifications of the instrumentalities employed and of the steps of the process may be made and still fall within the scope of the invention. It is contemplated by the appended claims to cover any such modifications that fall within the true scope and spirit of this invention.

What I claim as new and desire to be secured by Letters Patent of the United States is:

1. An ultrasonic temperature measuring arrangement comprising:
   (a) a transducer for producing torsional waves;
   (b) a wave guide coupled to said transducer for transmitting torsional waves from said transducer along its outer surface;
   (c) the outer dimension of said wave guide being smaller than the outer dimensions of the transducer;
   (d) transitional coupling means between said transducer and said wave guide for coupling the torsional wave from the larger outer dimension of the transducer to the smaller outer dimension of the wave guide, said means including a tapered mounting element supporting said transducer on its large end and contacting said wave guide at its smaller end, the dimensions of its smaller end being the same as the outer dimensions of said wave guide;
   (e) temperature sensing means coupled to said wave guide, said temperature sensing means being fabricated of material having a torsional modulus dependent on temperature, said temperature sensing means being positioned in a medium whose temperature is to be measured,
   (f) a discontinuity in said temperature sensing means for reflecting a portion of the torsional wave from said wave guide to produce a first pulse, said discontinuity defining the beginning of a sensing path fabricated of the material having a temperature dependent torsional modulus, the remaining torsional energy being transmitted over said path and reflected from the end thereof to produce a second pulse whereby the time interval between said pulses is proportional to the temperature,
   (g) mounting means for said wave guide positioned at the nodal points of the torsional waves transmitted along the surface of said wave guide,
   (h) means coupled to said transducer means for measuring the time interval between the pulses reflected back from the discontinuity and the end of the temperature sensing means for producing an electrical signal representative of the temperature being measured.

2. The temperature measuring arrangement according to claim 1 wherein said tapered mounting head is of a conical configuration.

3. The temperature measuring arrangement according to claim 2 wherein said mounting head is a frustrum of a cone.

4. The temperature measuring arrangement according to claim 1 wherein said waveguide is cylindrical and the torsional wave is transmitted substantially over the outer surface of said waveguide.

5. The temperature measuring arrangement according to claim 1 wherein the end of said path from which said remaining torsional energy is reflected has a spherical shape to minimize pulse distortion and secondary reflections.

6. A temperature measuring arrangement according to claim 1 wherein the transitional coupling means is a truncated cone, the smaller end of which is directly attached to one end of the wave guide.

7. A temperature measuring arrangement according to claim 6 wherein the transducer supported on the large end of the truncated cone for producing the torsional wave is a toroid.

8. A temperature measuring arrangement according to claim 7 wherein, the wave guide is flexible.

* * * * *